(12) United States Patent
Li et al.

(10) Patent No.: US 11,855,709 B2
(45) Date of Patent: *Dec. 26, 2023

(54) RADIO LINK MONITORING (RLM) ENHANCEMENTS

(71) Applicant: Apple Inc., Cupertino, CA (US)

(72) Inventors: Qiming Li, Beijing (CN); Hua Li, Beijing (CN); Manasa Raghavan, Sunnyvale, CA (US); Jie Cui, Santa Clara, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,583

(22) Filed: Sep. 20, 2022

(65) Prior Publication Data

US 2023/0019339 A1 Jan. 19, 2023

Related U.S. Application Data

(63) Continuation of application No. 17/284,231, filed as application No. PCT/US2019/055441 on Oct. 9, 2019, now Pat. No. 11,483,082.

(60) Provisional application No. 62/744,022, filed on Oct. 10, 2018.

(51) Int. Cl.
| | | |
|---|---|---|
| *H04L 23/02* | (2006.01) | |
| *H04B 17/373* | (2015.01) | |
| *H04B 7/06* | (2006.01) | |
| *H04L 5/00* | (2006.01) | |
| *H04L 43/0823* | (2022.01) | |

(52) U.S. Cl.
CPC ......... *H04B 17/373* (2015.01); *H04B 7/0695* (2013.01); *H04L 5/0048* (2013.01); *H04L 43/0823* (2013.01)

(58) Field of Classification Search
CPC .... H04B 17/373; H04B 7/088; H04B 7/0456; H04L 5/0048; H04L 43/0823; H04L 1/0618; H04L 1/06; H04W 24/08; H04W 48/08; H04W 72/042; H04W 72/046; H04W 72/0453
USPC ........................................ 375/262, 260, 267
See application file for complete search history.

(56) References Cited

U.S. PATENT DOCUMENTS

| | | | |
|---|---|---|---|
| 11,483,082 B2 * | 10/2022 | Li | ................ H04B 17/373 |
| 2019/0200249 A1 | 6/2019 | Yoon et al. | |
| 2020/0296656 A1 | 9/2020 | Amuru et al. | |
| 2021/0344433 A1 | 11/2021 | Li et al. | |

(Continued)

FOREIGN PATENT DOCUMENTS

WO WO 2013-173018 A1 11/2013

OTHER PUBLICATIONS

International Search Report and Written Opinion of the International Searching Authority directed to related International Patent Application No. PCT/US2019/055441, dated Feb. 3, 2020, 11 pages.

(Continued)

*Primary Examiner* — Khai Tran
(74) *Attorney, Agent, or Firm* — Sterne, Kessler, Goldstein & Fox P.L.L.C.

(57) ABSTRACT

Methods, systems, and storage media are described for the Embodiments discussed herein may relate to enhancements to radio link monitoring (RLM) for new radio (NR) systems. Other embodiments may be described and/or claimed.

20 Claims, 7 Drawing Sheets

(56) References Cited

U.S. PATENT DOCUMENTS

2021/0351975 A1* 11/2021 Matsumura ........... H04L 27/261
2022/0022064 A1   1/2022 Raghavan et al.
2022/0124724 A1*  4/2022 Lee ..................... H04B 7/0695

OTHER PUBLICATIONS

Intel Corporation, "Summary of Discussion for NR Radio Link Monitoring", R1-1807629, 3GPP TSG RAN WG1 Meeting #93, Busan, South Korea, May 24, 2018.
Mediatek Inc., "Remaining Issues on RLM", R4-1812509, 3GPP TSG-RAN WG4 Meeting #88-BIS, Chengdu, China, Sep. 28, 2018.
ZTE, "Remaining Issues on CSI-RS Based RLM", R4-1812862, 3GPP TSG-RAN WG4 Meeting #88-BIS, Chengdu, China, Sep. 28, 2018.
3GPP TS 38.133 V15.3.0, "3GPP; TSG RAN; NR; Requirements for Support of Radio Resource Management (Release 15)", Oct. 3, 2018.

* cited by examiner

300

Determining, based on information associated with a RLM-RS resource, that the RLM-RS resource is configured for quasi co-location (QCL) Type D with more than one control resource set (CORESET)
305

Determining, based on the RLM-RS resource being configured for QCL Type D with more than one CORESET, a physical downlink control channel (PDCCH) parameter for radio link monitoring (RLM)
310

FIG. 3

RADIO LINK MONITORING (RLM) ENHANCEMENTS

RELATED APPLICATION

This application is a continuation of U.S. non-provisional patent application Ser. No. 17/284,231 filed on Apr. 9, 2021, which is a U.S. National Stage entry of PCT/US2019/055441, filed on Oct. 9, 2019, which claims priority to U.S. Provisional Patent Application No. 62/744,022 filed Oct. 10, 2018 and entitled "RADIO LINK MONITORING (RLM) ENHANCEMENTS," the entire disclosures of all of which are incorporated herein by reference in their entireties.

BACKGROUND

Among other things, embodiments described herein are directed to enhancements to radio link monitoring (RLM) for new radio (NR) systems. Embodiments of the present disclosure may be utilized in conjunction with a variety of RLM-reference signal (RLM-RS) resources, including synchronization signal blocks (SSBs) or channel state information-reference signals (CSI-RSs).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 1 and 2, and 3 illustrate examples of operation flow/algorithmic structures in accordance with some embodiments.

DETAILED DESCRIPTION

Figure 1:
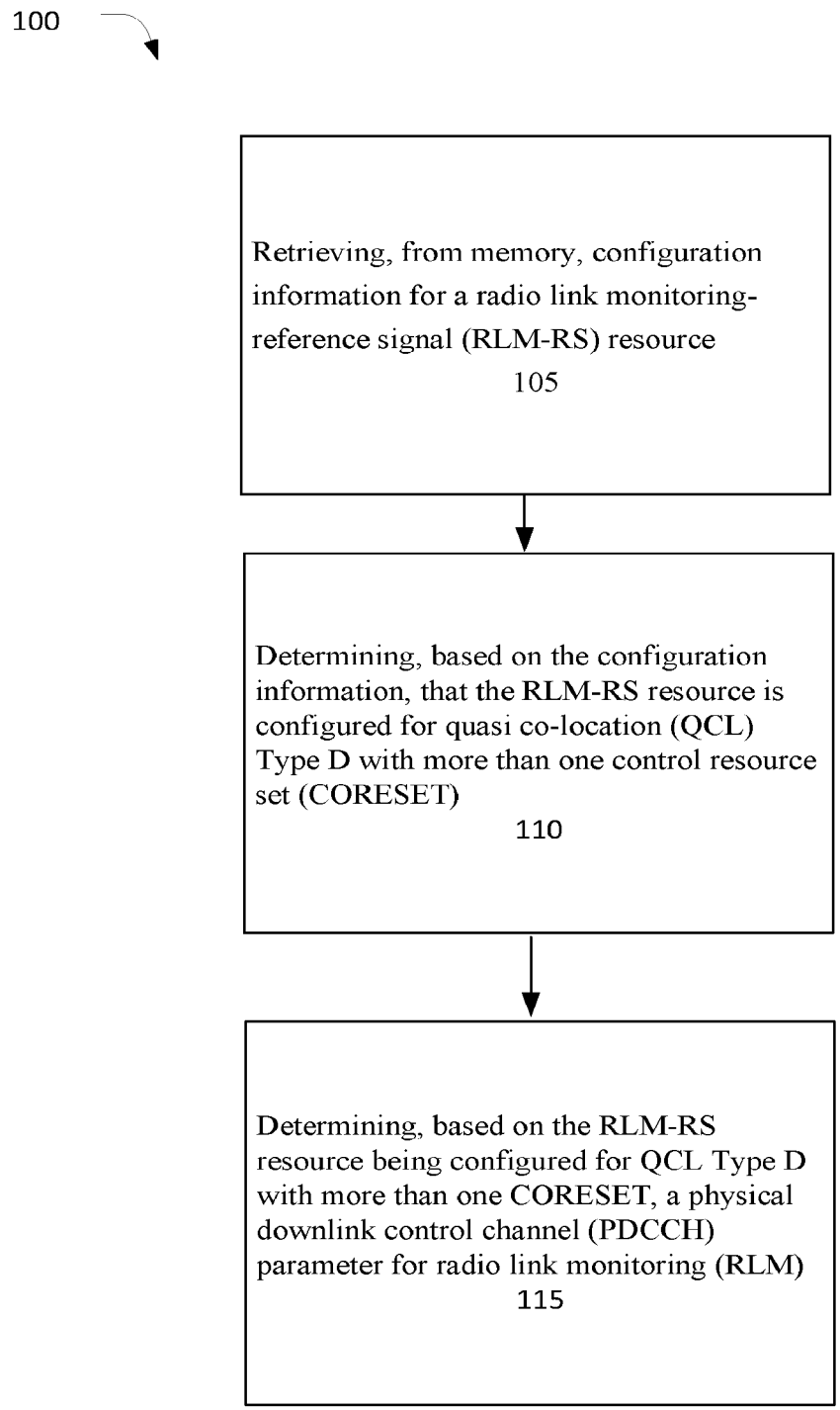

Embodiments discussed herein may relate to enhancements to radio link monitoring (RLM) for new radio (NR) systems. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like may refer to the same, or different, embodiments. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

In NR systems, the UE is to monitor the downlink link quality based on the reference signal in the configured RLM-RS resource(s) in order to detect the downlink radio link quality of the serving cell. The configured RLM-RS resources can be all SSBs, or all CSI-RSs, or a mix of SSBs and CSI-RSs.

On each RLM-RS resource, the UE is to estimate the downlink radio link quality and compare it to the thresholds $Q_{out}$ and $Q_{in}$ for the purpose of monitoring downlink radio link quality of the cell. The threshold $Q_{out}$ is defined as the level at which the downlink radio link cannot be reliably received and shall correspond to the out-of-sync block error rate ($BLER_{out}$). The threshold $Q_{in}$ is defined as the level at which the downlink radio link quality can be significantly more reliably received than at $Q_{out}$ and shall correspond to the in-sync block error rate ($BLER_{in}$), Both $Q_{out}$ and $Q_{in}$ are derived based on the hypothetical PDCCH (QCL-ed CORESET) BLER under certain configurations. Note that the UE will meet $Q_{out}/Q_{in}$ at different signal-to-noise ratio (SNR) levels under different configurations, which is determined by the control resource set (CORESET) parameters including, for example, bandwidth (BW), control channel element (CCE) level, and power boosting of RLM-RS.

However, the UE can be configured with more than one quasi-colocated (QCL-ed) CORESET with different parameters, which means the UE may declare $Q_{out}/Q_{in}$ at different SNR levels if different CORESET is chosen for RLM. However, there is no guidance in current specifications for how the UE is to choose a CORESET for RLM. To avoid ambiguity, new UE behavior should be introduced for this purpose.

The present disclosure provides embodiments for the new UE behavior for choosing a CORESET for RLM. The new UE behavior includes determining the PDCCH parameters for RLM based on various parameters or criteria if the configured RLM-RS resource is QCL-Type D with more than one CORESET. The parameters/criteria include:
1) the CORESET being used by the UE for PDCCH monitoring, if only one of the configured CORESET is being used by the UE for PDCCH monitoring; or
2) the CORESET with lowest index among the CORESET being used by the UE for PDCCH monitoring, if there are more than one configured CORESET which are being used for PDCCH monitoring; or
3) the CORESET with highest index among the CORESET being used by the UE for PDCCH monitoring, if there are more than one configured CORESET which are being used for PDCCH monitoring; or
4) the CORESET with minimum hypothetical PDCCH BLER among the CORESET being used by the UE for PDCCH monitoring, if there are more than one configured CORESET which are being used for PDCCH monitoring; or
5) the CORESET with maximum hypothetical PDCCH BLER among the CORESET being used by the UE for PDCCH monitoring, if there are more than one configured CORESET which are being used for PDCCH monitoring.

There are five possible behaviors as mentioned above, wherein the RLM-RS resource can be SSB, CSI-RS, mix of SSB and CSI-RS and any other pilot signal that can be used for RLM.

For the first possible behavior, The UE is to choose the CORESET which is configured as the PDCCH common search space and/or PDCCH specific search space to determine the PDCCH parameter for RLM. The benefit is that this CORESET can better reflect the radio link quality than the one which is not configured as the PDCCH common search space and; or PDCCH specific search space. Thus based on this UE can achieve accurate RLM.

If there are more than one CORESET configured as the PDCCH common search space and/or PDCCH specific search space, UE needs to pick one of them to determine PDCCH parameters for RLM (corresponding to possible behavior 2~5). UE can either choose the one with lowest or highest index. Alternatively, UE can choose the one with minimum PDCCH BLER (so that once RLF occurs on this CORESET, all the other CORESET would also trigger RLF) to increase robustness. This can be help in certain scenario, e.g. UE suddenly is blocked by a tree in a short time and then recovery soon. The UE is to not trigger RLF. Or, UE can also choose the one with maximum PDCCH BLER (so that it could trigger RLF quite easily) to achieve efficient RLM. This is a good strategy for high speed scenario (UE can trigger fast RLF and re-establish to neighbor cell).

Radio Link Monitoring (RLM) Aspects

Radio Link Monitoring (RLM) refers to mechanisms used by the UE for monitoring the downlink radio link quality of a primary cell for the purpose of indicating out-of-sync/in-sync status to higher layers. The UE is not required to monitor the downlink radio link quality in DL BWPs other than the active DL BWP on the primary cell.

If the UE is configured with an SCG, and the parameter rlf-TimersAndConstants is provided by the higher layers and is not set to release, the downlink radio link quality of the PSCell of the SCG is monitored by the UE for the purpose of indicating out-of-sync/in-sync status to higher layers. The UE is not required to monitor the downlink radio link quality in DL BWPs other than the active DL BWP, as described in Subclause 12, on the PSCell.

The UE can be configured for each DL BWP of an SpCell with a set of resource indexes, through a corresponding set of higher layer parameters RadioLinkMonitoringRS, for radio link monitoring by higher layer parameter failureDetectionResources. The UE is provided by higher layer parameter RadioLinkMonitoringRS, with either a CSI-RS resource configuration index, by higher layer parameter csi-RS-Index, or a SS/PBCH block index, by higher layer parameter sub-Index. The UE can be configured with up to $N_{LR-RLM}$ RadioLinkMonitoringRS for link recovery procedures, as discussed infra, and radio link monitoring. From the $N_{LR-RLM}$ RadioLinkMonitoringRS, up to $N_{RLM}$ RadioLinkMonitoringRS can be used for radio link monitoring depending on a maximum number L of candidate SS/PBCH blocks per half frame, and up to two RadioLinkMonitoringRS can be used for link recovery procedures.

If the UE is not provided higher layer parameter RadioLinkMonitoringRS and the UE is provided by higher layer parameter TCI-state for PDCCH one or more RSs that include one or more of a CSI-RS and/or a SS/PBCH block
   the UE uses for radio link monitoring the RS provided for the active TCI state for PDCCH if the active TCI state for PDCCH includes only one RS
   if the active TCI state for PDCCH includes two RS, the UE expects that one RS has QCL-TypeD and the UE uses the one RS for radio link monitoring; the UE does not expect both RS to have QCL-TypeD
   the UE is not required to use for radio link monitoring an aperiodic RS
   The UE is not expected to use more than $N_{RLM}$ RadioLinkMonitoringRS for radio link monitoring when the UE is not provided higher layer parameter RadioLinkMonitoringRS.

Values of $N_{LR-RLM}$ and $N_{RLM}$ for different values of L are given in Table RLM-1.

TABLE RLM-1

$N_{LR-RLM}$ and $N_{RLM}$ as a function of maximum number L of SS/PSCH blocks per half frame

| L | $N_{LR-RLM}$ | $N_{RLM}$ |
|---|---|---|
| 4 | 2 | 2 |
| 8 | 6 | 4 |
| 64 | 8 | 8 |

For a CSI-RS resource configuration, the higher layer parameter powerControlOffsetSS is not applicable and a UE expects to be provided only 'No CDM' from higher layer parameter cdm-Type, only '1' and '3' from higher layer parameter density, and only '1 port' from higher layer parameter nrofPorts.

In non-DRX mode operation, the physical layer in the UE assesses once per indication period the radio link quality, evaluated over the previous time period against thresholds ($Q_{out}$ and $Q_{in}$) configured by higher layer parameter rlmInSyncOutOfSyncThreshold. The UE determines the indication period as the maximum between the shortest periodicity for radio link monitoring resources and 10 msec.

In DRX mode operation, the physical layer in the UE assesses once per indication period the radio link quality, evaluated over the previous time period, against thresholds ($Q_{out}$ and $Q_{in}$) provided by higher layer parameter rlmInSyncOutOfSyncThreshold. The UE determines the indication period as the maximum between the shortest periodicity for radio link monitoring resources and the DRX period.

The physical layer in the UE indicates, in frames where the radio link quality is assessed, out-of-sync to higher layers when the radio link quality is worse than the threshold $Q_{out}$ for all resources in the set of resources for radio link monitoring. When the radio link quality is better than the threshold $Q_{in}$ for any resource in the set of resources for radio link monitoring, the physical layer in the UE indicates, in frames where the radio link quality is assessed, in-sync to higher layers.

The UE is to monitor the downlink link quality based on the reference signal in the configured RLM-RS resource(s) in order to detect the downlink radio link quality of the PCell and PSCell. The configured RLM-RS resources can be all SSBs, or all CSI-RSs, or a mix of SSBs and CSI-RSs. UE is not required to perform RLM outside the active DL BWP. The Reference Signal for RLM (RLM-RS) resource is a resource out of the set of resources configured for RLM by higher layer parameter RLM-RS-List.

On each RLM-RS resource, the UE is to estimate the downlink radio link quality and compare it to the thresholds $Q_{out}$ and $Q_{in}$ for the purpose of monitoring downlink radio link quality of the cell.

The threshold $Q_{out}$ is defined as the level at which the downlink radio link cannot be reliably received and is to correspond to the out-of-sync block error rate ($BLER_{out}$) as defined in Table RLM.1-1. For SSB based radio link monitoring, $Q_{out\_SSB}$ is derived based on the hypothetical PDCCH transmission parameters listed in Table RLM.2-1. For CSI-RS based radio link monitoring, $Q_{out\_CSI-RS}$ is derived based on the hypothetical PDCCH transmission parameters listed in Table RLM.3-1.

The threshold $Q_{in}$ is defined as the level at which the downlink radio link quality can be significantly more reliably received than at $Q_{out}$ and is to correspond to the in-sync block error rate ($BLER_{in}$) as defined in Table RLM.1-1. For SSB based radio link monitoring, $Q_{in\_SSB}$ is derived based on the hypothetical PDCCH transmission parameters listed in Table RLM.2-2. For CSI-RS based radio link monitoring, $Q_{in\_CSI-RS}$ is derived based on the hypothetical PDCCH transmission parameters listed in Table RLM.3-2.

The out-of-sync block error rate ($BLER_{out}$) and in-sync block error rate ($BLER_{in}$) are determined from the network configuration via parameter RLM-IS-OOS-thresholdConfig signalled by higher layers. The network can configure one of the two pairs of out-of-sync and in-sync block error rates which are shown in Table RLM.1-1. When UE is not configured with RLM-IS-OOS-thresholdConfig from the network, UE determines out-of-sync and in-sync block error rates from Configuration #0 in Table RLM.1-1 as default.

TABLE RLM.1-1

| Out-of-sync and in-sync block error rates | | |
|---|---|---|
| Configuration | $BLER_{out}$ | $BLER_{in}$ |
| 0 | 10% | 2% |
| 1 | TBD | TBD |

In some embodiments, the UE is to be able to monitor up to $X_{RLM-RS}$ RLM-RS resources of the same or different types in each corresponding carrier frequency range, where $X_{RLM-RS}$ is specified in Table RLM.1-2, and meet the requirements as specified below.

TABLE RLM.1-2

| Maximum number of RLM-RS resources $X_{RLM-RS}$ | |
|---|---|
| Maximum number of RLM-RS resources, $X_{RLM-RS}$ | Carrier frequency range of PCell/PSCell |
| 2 | FR1, ≤ 3 GHz |
| 4 | FR1, > 3 GHz |
| 8 | FR2 |

Requirements for SSB Based Radio Link Monitoring

Each SSB based RLM-RS resource is configured for a PCell and/or a PSCell provided that the SSB configured for RLM are actually transmitted within UE active DL BWP during the entire evaluation period specified below.

TABLE RLM.2-1

| PDCCH transmission parameters for out-of-sync | | |
|---|---|---|
| Attribute | Value for BLER pair#0 | Value for BLER pair#1 |
| DCI format | 1-0 | TBD |
| Number of control OFDM symbols | Same as the number of symbols of RMSI CORESET | |
| Aggregation level (CCE) | 8 | |
| Ratio of hypothetical PDCCH RE energy to average SSS RE energy | 4 dB | |
| Ratio of hypothetical PDCCH DMRS energy to average SSS RE energy | 4 dB | |
| Bandwidth (MHz) | Same as the number of PRBs of RMSI CORESET | |

TABLE RLM.2-1-continued

PDCCH transmission parameters for out-of-sync

| Attribute | Value for BLER pair#0 | Value for BLER pair#1 |
|---|---|---|
| Sub-carrier spacing (kHz) | Same as the SCS of RMSI CORESET | |
| DMRS precoder granularity | REG bundle size | |
| REG bundle size | 6 | |
| CP length | Same as the CP length of RMSI CORESET | |
| Mapping from REG to CCE | Distributed | |

TABLE RLM.2-2

PDCCH transmission parameters for in-sync

| Attribute | Value for BLER pair#0 | Value for BLER pair#1 |
|---|---|---|
| DCI payload size | 1-0 | |
| Number of control OFDM symbols | Same as the number of symbols of RMSI CORESET | |
| Aggregation level (CCE) | 4 | |
| Ratio of hypothetical PDCCH RE energy to average SSS RE energy | 0 dB | |
| Ratio of hypothetical PDCCH DMRS energy to average SSS RE energy | 0 dB | TBD |
| Bandwidth (MHz) | Same as the number of PRBs of RMSI CORESET | |
| Sub-carrier spacing (kHz) | Same as the SCS of RMSI CORESET | |
| DMRS precoder granularity | REG bundle size | |
| REG bundle size | 6 | |
| CP length | Same as the CP length of RMSI CORESET | |
| Mapping from REG to CCE | Distributed | |

Minimum Requirements

In some embodiments, the UE is to be able to evaluate whether the downlink radio link quality on the configured RLM-RS resource estimated over the last $T_{Evaluate\_out\_SSB}$ [ms] period becomes worse than the threshold $Q_{out\_SSB}$ within $T_{Evaluate\_out\_SSB}$ [ms] evaluation period.

In some embodiments, the UE is to be able to evaluate whether the downlink radio link quality on the configured RLM-RS resource estimated over the last $T_{Evaluate\_in\_SSB}$ [ms] period becomes better than the threshold $Q_{in\_SSB}$ within $T_{Evaluate\_in\_SSB}$ [ms] evaluation period.

$T_{Evaluate\_out\_SSB}$ and $T_{Evaluate\_in\_SSB}$ are defined in Table RLM.2-3 for FR1.

$T_{Evaluate\_out\_SSB}$ and $T_{Evaluate\_in\_SSB}$ are defined in Table RLM.2-4 for FR2 with
 N=1, if the SSB configured for RLM is spatially QCLed and TDMed to CSI-RS resources configured for BM, and the QCL association is known to UE;
 N=FFS, otherwise.
 For FR1,
 $P=1/(1-T_{SSB}/MGRP)$, when in the monitored cell there are measurement gaps configured for intra-frequency, inter-frequency or inter-RAT measurements, which are overlapping with some but not all occasions of the SSB; and
 P=1 when in the monitored cell there are no measurement gaps overlapping with any occasion of the SSB.
 For FR2,
 $P=1/(1-T_{SSB}/T_{SMTCperiod})$, when RLM-RS is not overlapped with measurement gap and RLM-RS is partially overlapped with SMTC occasion ($T_{SSB}=T_{SMTCperiod}$).
 P is $P_{sharing\ factor}$, when RLM-RS is not overlapped with measurement gap and RLM-RS is fully overlapped with SMTC period ($T_{SSB}=T_{SMTCperiod}$).
 P is $1/(1-T_{SSB}/MGRP-T_{SSB}/T_{SMTCperiod})$, when RLM-RS is partially overlapped with measurement gap and RLM-RS is partially overlapped with SMTC occasion ($T_{SSB}<T_{SMTCperiod}$) and SMTC occasion is not overlapped with measurement gap, and
 $T_{SMTCperiod} \neq MGRP$ or
 $T_{SMTCperiod}=MGRP$ and $T_{SSB}<0.5*T_{SMTCperiod}$
 P is $1/(1-T_{SSB}/MGRP)*P_{sharing\ factor}$, when RLM-RS is partially overlapped with measurement gap and RLM-RS is partially overlapped with SMTC occasion ($T_{SSB}<T_{SMTCperiod}$) and SMTC occasion is not overlapped with measurement gap and $T_{SMTCperiod}=MGRP$ and $T_{SSB}=0.5*T_{SMTCperiod}$
 P is $1/\{1-T_{SSB}/\min(T_{SMTCperiod}, MGRP)\}$, when RLM-RS is partially overlapped with measurement gap and RLM-RS is partially overlapped with SMTC occasion ($T_{SSB}<T_{SMTCperiod}$) and SMTC occasion is partially overlapped with measurement gap ($T_{SMTCperiod}<MGRP$)
 P is $1/(1-T_{SSB}/MGRP)*P_{sharing\ factor}$, when RLM-RS is partially overlapped with measurement gap and RLM-RS is fully overlapped with SMTC occasion ($T_{SSB}=T_{SMTCperiod}$) and SMTC occasion is partially overlapped with measurement gap ($T_{SMTCperiod}<MGRP$)
 $P_{sharing\ factor}$ is FFS Longer evaluation period would be expected if the combination of RLM-RS, SMTC occasion and measurement gap configurations does not meet pervious conditions.

TABLE RLM.2-3

Evaluation period $T_{Evaluate\_out}$ and $T_{Evaluate\_in}$ for FR1

| Configuration | $T_{Evaluate\_out}$ (ms) | $T_{Evaluate\_in}$ (ms) |
|---|---|---|
| non-DRX | max(200,ceil(10 * P) * $T_{SSB}$) | max(100,ceil(5 * P) * $T_{SSB}$) |
| DRX cycle ≤ 320 | max(200,cei(15 * P) * max($T_{DRX}$, $T_{SSB}$)) | max(100,ceil(7.5 * P) * max($T_{DRX}$, $T_{SSB}$)) |
| DRX cycle > 320 | ceil(10 * P) * $T_{DRX}$ | ceil(5 * P) * $T_{DRX}$ |

NOTE:
$T_{SSB}$ is the periodicity of SSB configured for RLM. $T_{DRX}$ is the DRX cycle length.

TABLE RLM.2-4

Evaluation period $T_{Evaluate\_out}$ and $T_{Evaluate\_in}$ for FR2

| Configuration | $T_{Evaluate\_out}$ (ms) | $T_{Evaluate\_in}$ (ms) |
|---|---|---|
| non-DRX | max(200,ceil(10 * P * N) * $T_{SSB}$) | max(100, ceil(5 * P * N) * $T_{SSB}$) |
| DRX cycle ≤ 320 | max(200,cei(15 * P * N) * max($T_{DRX}$, $T_{SSB}$)) | max( 00,ceil(7.5 * P * N) * max($T_{DRX}$, $T_{SSB}$)) |
| DRX cycle > 320 | ceil(10 * P * N) * $T_{DRX}$ | ceil(S * P * N) * $T_{DRX}$ |

NOTE:
$T_{SSB}$ is the periodicity of SSB configured for RLM. $T_{DRX}$ is the DRX cycle length.

Requirements for CSI-RS Based Radio Link Monitoring

In some embodiments, each CSI-RS based RLM-RS resource is configured for a PCell and/or a PSCell provided that the CSI-RS configured for RLM are actually transmitted within UE active DL BWP during, the entire evaluation period specified below.

TABLE RLM.3-1

PDCCH transmission parameters for out-of-sync

| Attribute | Value for BLER pair#0 | Value for BLER pair#1 |
|---|---|---|
| DCI format | 1-0 | TBD |
| Number of control OFDM symbols | Same as the number of symbols of CORESET QCLed with respective CSI-RS for RLM | |
| Aggregation level (CCE) | 8] | |
| Ratio of hypothetical PDCCH RE energy to average CSI-RS RE energy | [4] dB | |
| Ratio of hypothetical PDCCH DMRS energy to average CSI-RS RE energy | [4] dB | |
| Bandwidth (MHz) | Same as the number of PRBs of CORESET QCLed with respective CSI-RS for RLM | |
| Sub-carrier spacing (kHz) | Same as the SCS of CORESET QCLed with respective CSI-RS for RLM | |
| DMRS precoder granularity | REG bundle size | |
| REG bundle size | 6 | |
| CP length | Same as the CP length of CORESET QCLed with respective CSI-RS for RLM | |
| Mapping from REG to CCE | Distributed | |

TABLE RLM.3-2

PDCCH transmission parameters for in-sync

| Attribute | Value for BLER pair#0 | Value for BLER pair#1 |
|---|---|---|
| DCI payload size | [1-0] | TBD |
| Number of control OFDM symbols | Same as the number of symbols of CORESET QCLed with respective CSI-RS for RLM | |
| Aggregation level (CCE) | 4 | |
| Ratio of hypothetical PDCCH RE energy to average CSI-RS RE energy | [0] dB | |
| Ratio of hypothetical PDCCH DMRS energy to average CSI-RS RE energy | [o] dB | |
| Bandwidth (MHz) | Same as the number of PRBs of CORESET QCLed with respective CSI-RS for RLM | |
| Subcarrier spacing (kHz) | Same as the SCS of CORESET QCLed with respective CSI-RS for RLM | |
| DMRS precoder granularity | REG bundle size | |
| REG bundle size | 6 | |
| CP length | Same as the CP length of CORESET QCLed with respective CSI-RS for RLM | |
| Mapping from REG to CCE | Distributed | |

Minimum Requirements

In some embodiments, the UE is to be able to evaluate whether the downlink radio link quality on the configured RLM-RS resource estimated over the last $T_{Evaluate\_out\_CSI-RS}$ [ms] period becomes worse than the threshold $Q_{out\_CSI-RS}$ within $T_{Evaluate\_out\_CSI-RS}$ [ms] evaluation period.

In some embodiments, the UE is to be able to evaluate whether the downlink radio link quality on the configured RLM-RS resource estimated over the last $T_{Evaluate\_in\_CSI-RS}$ [ms] period becomes hotter than the threshold $Q_{in\_CSI-RS}$ within $T_{Evaluate\_in\_CSI-RS}$ [ms] evaluation period.

$T_{Evaluate\_out\_CSI-RS}$ and $T_{Evaluate\_in\_CSI-RS}$ are defined in Table RLM.3-3 for FR1.

$T_{Evaluate\_out\_CSI-RS}$ and $T_{Evaluate\_in\_CSI-RS}$ are defined in Table RLM.3-4 for FR2, where N=1, if the CSI-RS resource configured for RLM is spatially QCLed and TDMed to CSI-RS resources configured for BM or SSBs configured for BM, and the QCL association is known to UE;

N=FFS, otherwise.

For FR1,

P=1/(1−$T_{CSI-RS}$/MGRP), when in the monitored cell there are measurement gaps configured for intra-frequency, inter-frequency or inter-RAT measurements, which are overlapping with some hut not all occasions of the CSI-RS; and P=1 when in the monitored cell there are no measurement gaps overlapping with any occasion of the CSI-RS.

For FR2,

P=1, when RLM-RS is not overlapped with measurement gap and also not overlapped with SMTC occasion.

P=1/(1−$T_{CSI-RS}$/MGRP), when RLM-RS is partially overlapped with measurement gap and RLM-RS is not overlapped with SMTC occasion ($T_{CSI-RS}$<MGRP)

P=1/(1−$T_{CSI-RS}$/$T_{SMTCperiod}$), when RLM-RS is not overlapped with measurement gap and RLM-RS is partially overlapped with SMTC occasion ($T_{CSI-RS}$<$T_{SMTCperiod}$).

P is $P_{sharing\ factor}$, when RLM-RS is not overlapped with measurement gap and RLM-RS is fully overlapped with SMTC occasion ($T_{CSI-RS}$=$T_{SMTCperiod}$).

P is 1/(1−$T_{CSI-RS}$/MGRP−$T_{CSI-RS}$/$T_{SMTCperiod}$), when RLM-RS is partially overlapped with measurement gap and RLM-RS is partially overlapped with SMTC occasion ($T_{CSI-RS}$<$T_{SMTCperiod}$) and SMTC occasion is not overlapped with measurement gap and $T_{SMTCperiod}$≠MGRP or $T_{SMTCperiod}$=MGRP and $T_{CSI-RS}$<0.5*$T_{SMTCperiod}$ P is 1/(1−$T_{CSI-RS}$/MGRP)*$P_{sharing\ factor}$, when RLM-RS is partially overlapped with measurement gap and RLM-RS is partially overlapped with SMTC occasion ($T_{CSI-RS}$<$T_{SMTCperiod}$) and SMTC occasion is not overlapped with measurement gap and $T_{SMTCperiod}$=MGRP and $T_{CSI-RS}$=0.5*$T_{SMTCperiod}$ P is 1/{1−$T_{CSI-RS}$/min ($T_{SMTCperiod}$, MGRP)}, when RLM-RS is partially overlapped with measurement gap and RLM-RS is partially overlapped with SMTC occasion ($T_{CSI-RS}$<$T_{SMTCperiod}$) SMTC occasion is partially overlapped with measurement gap ($T_{SMTCperiod}$<MGRP)

P is 1/(1−$T_{CSI-RS}$/MGRP)*$P_{sharing\ factor}$, when RLM-RS is partially overlapped with measurement gap and RLM-RS is fully overlapped with SMTC occasion ($T_{CSI-RS}$=$T_{SMTCperiod}$) and SMTC occasion is partially overlapped with measurement gap ($T_{SMTCperiod}$<MGRP)

$P_{sharing\ factor}$ is FFS

Longer evaluation period would be expected if the combination of RLM-RS, SMTC occasion and measurement gap configurations does not meet pervious conditions.

The values of $M_{out}$ and $M_{in}$ used in Table RLM.3-3 and Table RLM.3-4 are defined as:

$M_{out}$=20 and $M_{in}$=10, if the CSI-RS resource configured for RLM is transmitted with Density=3.

TABLE RLM.3-3

Evaluation period $T_{Evaluate\_out}$ and $T_{Evaluate\_in}$ for FR1

| Configuration | $T_{Evaluate\_out}$ (ms) | $T_{Evaluate\_in}$ (ms) |
|---|---|---|
| non-DRX | $\max(200, \text{ceil}(M_{out} \times P) \times T_{CSI-RS})$ | $\max(100, \text{ceil}(M_{in} \times P) \times T_{CSI-RS})$ |
| DRX ≤ 320 ms | $\max(200, \text{ceil}(1.5 \times M_{out} \times P) \times \max(T_{DRX}, T_{CSI-RS}))$ | $\max(100, \text{ceil}(1.5 \times M_{in} \times P) \times \max(T_{DRX}, T_{CSI-RS}))$ |
| DRX > 320 ms | $\text{ceil}(M_{out} \times P) \times T_{DRX}$ | $\text{ceil}(M_{in} \times P) \times T_{DRX}$ |

NOTE:
$T_{CSI-RS}$ is the periodicity of CSI-RS configured for RLM. $T_{DRX}$ is the DRX cycle length.

TABLE RLM.3-4

Evaluation period $T_{Evaluate\_out}$ and $T_{Evaluate\_in}$ for FR2

| Configuration | $T_{Evaluate\_out}$ (ms) | $T_{Evaluate\_in}$ (ms) |
|---|---|---|
| non-DRX | $\max(200, \text{ceil}(M_{out} \times P \times N) \times T_{CSI-RS})$ | $\max(100, \text{ceil}(M_{in} \times P \times N) \times T_{CSI-RS})$ |
| DRX ≤ 320 ms | $\max(200, \text{ceil}(1.5 \times M_{out} \times P \times N) \times \max(T_{DRX}, T_{CSI-RS}))$ | $\max(100, \text{ceil}(1.5 \times M_{in} \times P \times N) \times \max(T_{DRX}, T_{CSI-RS}))$ |
| DRX > 320 ms | $\text{ceil}(M_{out} \times P \times N) \times T_{DRX}$ | $\text{ceil}(M_{in} \times P \times N) \times T_{DRX}$ |

NOTE:
$T_{CSI-RS}$ is the periodicity of CSI-RS configured for RLM. $T_{DRX}$ is the DRX cycle length.

Minimum Requirements for L1 Indication

In some embodiments, when the downlink radio link quality on all the configured RLM-RS resources is worse than $Q_{out}$, Layer 1 of the UE is to send an out-of-sync indication for the cell to the higher layers. A Layer 3 filter is to be applied to the out-of-sync indications.

In some embodiments, when the downlink radio link quality on at least one of the configured RLM-RS resources is better than $Q_{in}$, Layer 1 of the UE is to send an in-sync indication for the cell to the higher layers. A Layer 3 filter is to be applied to the in-sync indications.

The out-of-sync and in-sync evaluations for the configured RLM-RS resources is to be performed. Two successive indications from Layer 1 is to be separated by at least $T_{indication\_interval}$.

When DRX is not used $T_{indication\_interval}$ is max(10 ms, $T_{RLM-RS,M}$), where $T_{RLM,M}$ is the shortest periodicity of all configured RLM-RS resources for the monitored cell, which corresponds to $T_{SSB}$ if the RLM-RS resource is SSB, or $T_{CSI-RS}$ if the RLM-RS resource is CSI-RS.

In case DRX is used, upon start of T310 timer, the UE is to monitor the configured RLM-RS resources for recovery using the evaluation period and Layer 1 indication interval corresponding to the non-DRX mode until the expiry or stop of T310 timer.

Scheduling Availability of UE During Radio Link Monitoring

When the reference signal to be measured for RLM has different subcarrier spacing than PDSCH/PDCCH and on frequency range FR2, there are restrictions on the scheduling availability as described below.

Scheduling Availability of UE Performing Radio Link Monitoring with a Same Subcarrier Spacing as PDSCH/PDCCH on FR1

There are no scheduling restrictions due to radio link monitoring performed with a same subcarrier spacing as PDSCH/PDCCH on FR1.

Scheduling Availability of UE Performing Radio Link Monitoring with a Different Subcarrier Spacing than PDSCH/PDCCH on FR1

For UE which support simultaneousRxDataSSB-DiffNumerology [14] there are no restrictions on scheduling availability due to radio link monitoring based on SSB as RLM-RS. For UE which do not support simultaneousRxDataSSB-DiffNumerology [14] the following restrictions apply due to radio link monitoring based on SSB as RLM-RS. The UE is not expected to transmit PUCCH/PUSCH or receive PDCCH/PDSCH on SSB symbols to be measured for radio link monitoring.

When intra-band carrier aggregation is performed, the scheduling restrictions apply to all serving cells on the band due to radio link monitoring performed on FR1 serving PCell or PSCell in the same band. When inter-band carrier aggregation within FR1 is performed, there are no scheduling restrictions on FR1 serving cell(s) in the bands due to radio link monitoring performed on FR1 serving PCell or PSCell in different bands.

Scheduling Availability of UE Performing Radio Link Monitoring on FR2

The following scheduling restriction applies due to radio link monitoring on an FR2 serving PCell and/or PSCell.

The UE is not expected to transmit PUCCH/PUSCH or receive PDCCH/PDSCH on RLM-RS symbols to be measured for radio link monitoring, except for RMSI PDCCH/PDSCH and PDCCH/PDSCH which is not required to be received by RRC_CONNECTED mode UE.

Scheduling Availability of UE Performing Radio Link Monitoring on FR1 or FR2 in Case of FR1-FR2 Inter-Band CA There are no scheduling restrictions on FR1 serving cell(s) due to radio link monitoring performed on FR2 serving PCell and/or PSCell.

There are no scheduling restrictions on FR2 serving cell(s) due to radio link monitoring performed on FR1 serving PCell and/or PSCell.

Link Recovery Procedures

A UE can be provided, for a serving cell, with a set $\bar{q}_0$ of periodic CSI-RS resource configuration indexes by higher layer parameter failureDetectionResources and with a set $\bar{q}_1$ of periodic CSI-RS resource configuration indexes and/or SS/PBCH block indexes by higher layer parameter candidateBeamRSList for radio link quality measurements on the serving cell. If the UE is not provided with higher layer parameter failureDetectionResources, the UE determines the set $\bar{q}_0$ to include SS/PBCH block indexes and periodic CSI-RS resource configuration indexes with same values as the RS indexes in the RS sets indicated by the TCI states for respective control resource sets that the UE uses for monitoring PDCCH. The UE expects the set $\bar{q}_0$ to include up to two RS indexes and, if there are two RS indexes, the set $\bar{q}_0$ includes only RS indexes with QCL-TypeD configuration for the corresponding TCI states. The UE expects single port RS in the set $\bar{q}_0$.

The threshold $Q_{out,LR}$ corresponds to the default value of higher layer parameter rlmInSyncOutOfSyncThreshold and to the value provided by higher layer parameter rsrp-ThresholdSSB, respectively.

The physical layer in the UE assesses the radio link quality according to the set $\bar{q}_0$ of resource configurations against the threshold $Q_{out,LR}$. For the set $\bar{q}_0$, the UE assesses the radio link quality only according to periodic CSI-RS resource configurations or SS/PBCH blocks that are quasi co-located, as described in, with the DM-RS of PDCCH receptions monitored by the UE. The UE applies the $Q_{in,LR}$ threshold to the L1-RSRP measurement obtained from a SS/PBCH block. The UE applies the $Q_{in,LR}$ threshold to the L1-RSRP measurement obtained for a CSI-RS resource after scaling a respective CSI-RS reception power with a value provided by higher layer parameter powerControlOffsetSS.

The physical layer in the UE provides an indication to higher layers when the radio link quality for all corresponding resource configurations in the set $\bar{q}_0$ that the UE uses to assess the radio link quality is worse than the threshold $Q_{out,LR}$. The physical layer informs the higher layers when the radio link quality is worse than the threshold $Q_{out,LR}$ with a periodicity determined by the maximum between the shortest periodicity of periodic CSI-RS configurations or SS/PBCH blocks in the set $\bar{q}_0$ that the UE uses to assess the radio link quality and 2 msec.

Upon request from higher layers, the UE provides to higher layers the periodic CSI-RS configuration indexes and/or SS/PBCH block indexes front the set $\bar{q}_1$ and the corresponding L1-RSRP measurements that are larger than or equal to the corresponding thresholds.

A UE may be provided with a control resource set through a link to a search space set provided by higher layer parameter recoverySearchSpaceId, as described in Subclause 10.1, for monitoring PDCCH in the control resource set. If the UE is provided higher layer parameter recoverySearchSpaceId, the UE does not expect to be provided another search space set for monitoring PDCCH in the control resource set associated with the search space set provided by recoverySearchSpaceId.

The UE may receive by higher layer parameter PRACH-ResourceDedicatedBFR, a configuration for PRACH transmission as described in Subclause 8.1. For PRACH transmission in slot n and according to antenna port quasi co-location parameters associated with periodic CSI-RS configuration or SS/PBCH block with index $q_{new}$ provided by higher layers, the UE monitors PDCCH in a search space provided by higher layer parameter recoverySearchSpaceId for detection of a DCI format with CRC scrambled by C-RNTI starting from slot n+4 within a window configured by higher layer parameter BeamFailureRecoveryConfig. For the PDCCH monitoring and for the corresponding PDSCH reception, the UE assumes the same antenna port quasi-collocation parameters with index $q_{new}$ until the UE receives by higher layers an activation for a TCI state or any of the parameters TCI-StatesPDCCH-ToAddlist and/or TCI-StatesPDCCH-ToReleaseList. After the UE detects a DCI format with CRC scrambled by C-RNTI in the search space provided by recoverySearchSpaceId the UE monitors PDCCH candidates in the search space provided by recoverySearchSpaceId until the UE receives a MAC CE activation command for a TCI state or higher layer parameters TCI-StatesPDCCH-ToAddlist and/or TCI-StatesPDCCH-ToReleaseList.

If the UE is not provided a control resource set for a search space set provided recoverySearchSpaceId or if the UE is not provided recoverySearchSpaceId, the UE does not expect to receive a PDCCH order triggering a PRACH transmission.

Figure 4:
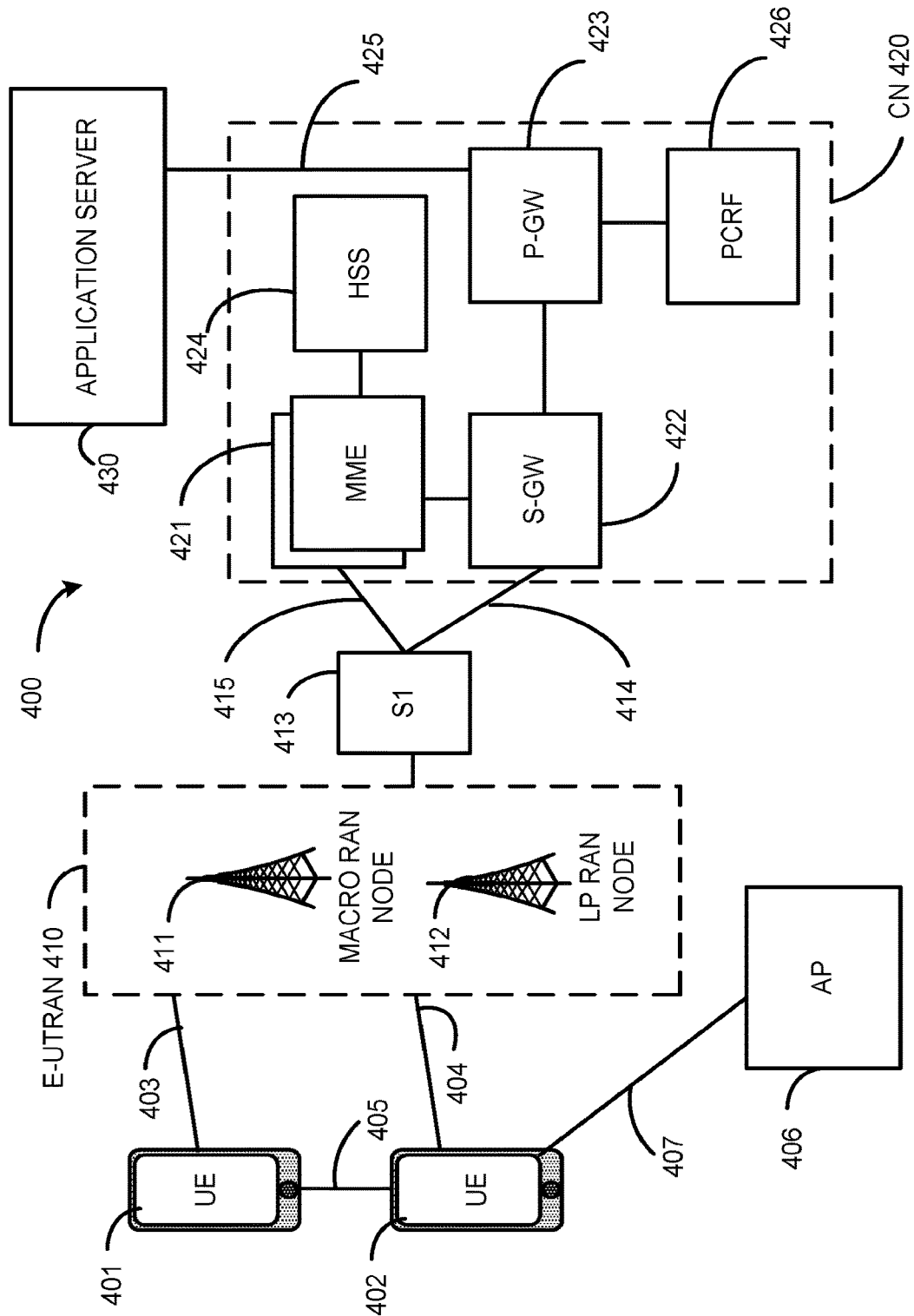
FIG. 4 depicts an architecture of a system of a network in accordance with some embodiments.

FIG. 4 illustrates an architecture of a system 400 of a network in accordance with some embodiments. The system 400 is shown to include a user equipment (UE) 401 and a UE 402. The UEs 401 and 402 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 401 and 402 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) Of device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 401 and 402 may be configured to connect, e.g, communicatively couple, with a radio access network (RAN) 410—the RAN 410 may be, for example, an Evolved Universal Mobile Telecommunications System (UMTS) Terrestrial Radio Access Network (E-UTRAN), a NextGen RAN (NG RAN), or some other type of RAN. The UEs 401 and 402 utilize connections 403 and 404, respectively, each of which comprises a physical communications interface or layer (discussed in further detail below); in this example, the connections 403 and 404 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 401 and 402 may further directly exchange communication data via a ProSe interface 405. The ProSe interface 405 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 402 is shown to be configured to access an access point (AP) 406 via connection 407. The connection 407 can comprise a local wireless connection, such as a connection consistent with any IEEE 802.11 protocol, wherein the AP 406 would comprise a wireless fidelity (WiFi®) router. In this example, the AP 406 is shown to be connected to the Internet without connecting to the core network of the wireless system (described in further detail below).

The RAN 410 can include one or more access nodes that enable the connections 403 and 404. These access nodes (ANs) can be referred to as base stations (BSs). NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 410 may include one or more RAN nodes for providing macrocells, e.g., macro RAN node 411, and one or more RAN nodes for providing femtocells or picocells (e.g., cells having smaller coverage areas, smaller user capacity, or higher bandwidth compared to macrocells), e.g., low power (LP) RAN node 412.

Any of the RAN nodes 411 and 412 can terminate the air interface protocol and can be the first point of contact for the UEs 401 and 402. In some embodiments, any of the RAN nodes 411 and 412 can fulfill various logical functions for the RAN 410 including, but not limited to, radio network controller (RNC) functions such as radio bearer management, uplink and downlink dynamic radio resource management and data packet scheduling, and mobility management.

In accordance with some embodiments, the UEs 401 and 402 can be configured to communicate using Orthogonal Frequency-Division Multiplexing (OFDM) communication signals with each other or with any of the RAN nodes 411 and 412 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 411 and 412 to the UEs 401 and 402, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 401 and 402. The physical downlink control channel (PDCCH) may carry information about the transport format and resource allocations related to the PDSCH channel, among other things. It may also inform the UEs 401 and 402 about the transport format, resource allocation, and H-ARQ (Hybrid Automatic Repeat Request) information related to the uplink shared channel. Typically, downlink scheduling (assigning control and shared channel resource blocks to the UE 402 within a cell) may be performed at any of the RAN nodes 411 and 412 based on channel quality information fed back from any of the UEs 401 and 402. The downlink resource assignment information may be sent on the PDCCH used for (e.g., assigned to) each of the UEs 401 and 402.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 410 is shown to be communicatively coupled to a core network (CN) 420—via an S1 interface 413. In embodiments, the CN 420 may be an evolved packet core (EPC) network, a NextGen Packet Core (NPC) network, or some other type of CN. In this embodiment, the S1 interface 413 is split into two parts: the S1-U interface 414, which carries traffic data between the RAN nodes 411 and 412 and the serving gateway (S-GW) 422, and the S1-mobility management entity (MME) interface 415, which is a signaling interface between the RAN nodes 411 and 412 and MMEs 421.

In this embodiment, the CN 420 comprises the MMEs 421, the S-GW 422, the Packet Data Network (PDN) Gateway (P-GW) 423, and a home subscriber server (HSS) 424. The MMEs 421 may be similar in function to the control plane of legacy Serving General Packet Radio Service (CPRS) Support Nodes (SGSN). The MMEs 421 may manage mobility aspects in access such as gateway selection and tracking area list management. The HSS 424 may comprise a database for network users, including subscription-related information to support the network entities' handling of communication sessions. The CN 420 may comprise one or several HSSs 424, depending on the number of mobile subscribers, on the capacity of the equipment, on the organization of the network, etc. For example, the HSS 424 can provide support for routing/roaming, authentication, authorization, naming/addressing resolution, location dependencies, etc.

The S-GW 422 may terminate the S1 interface 413 towards the RAN 410, and routes data packets between the RAN 410 and the CN 420. In addition, the S-GW 422 may be a local mobility anchor point for inter-RAN node handovers and also may provide an anchor for inter-3GPP mobility. Other responsibilities may include lawful intercept, charging, and some policy enforcement.

The P-GW 423 may terminate an SGi interface toward a PDN. The P-GW 423 may route data packets between the EPC network and external networks such as a network including the application server 430 (alternatively referred to as application function (AF)) via an Internet Protocol (IP) interface 425. Generally, the application server 430 may be an element offering applications that use IP hearer resources with the core network (e.g., UMTS Packet Services (PS) domain, LTE PS data services, etc.). In this embodiment, the P-GW 423 is shown to be communicatively coupled to an application server 430 via an IP communications interface 425. The application server 430 can also be configured to support one or more communication services (e.g., Voice-over-Internet Protocol (VOIP) sessions, PTT sessions, group communication sessions, social networking services, etc.) for the UEs 401 and 402 via the CN 420.

The P-GW 423 may further be a node for policy enforcement and charging data collection. Policy and Charging Enforcement Function (PCRF) 426 is the policy and charging control element of the CN 420. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 426 may be communicatively coupled to the application server 430 via the P-GW 423. The application server 430 may signal the PCRF 426 to indicate a new service flow and select the appropriate Quality of Service (QoS) and charging parameters. The PCRF 426 may provision this rule into a Policy and Chaining Enforcement Function (PCEF) (not shown) with the appropriate traffic flow template (TFT) and QoS class of identifier (QCI), which commences the QoS and charging as specified by the application server 430.

Figure 5:
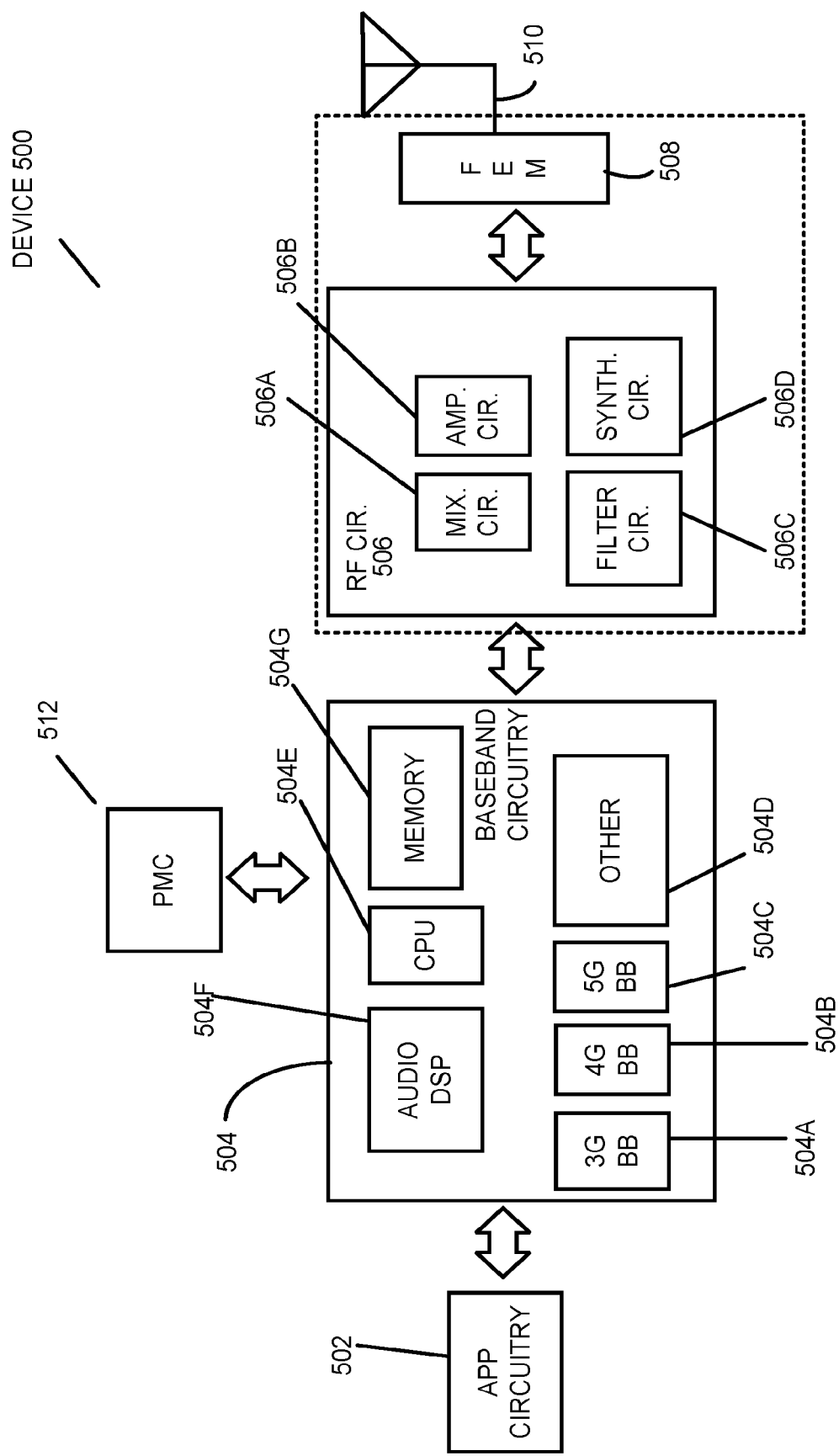
FIG. 5 depicts an example of components of a device in accordance with some embodiments.

FIG. 5 illustrates example components of a device 500 in accordance with some embodiments. In some embodiments, the device 500 may include application circuitry 502, baseband circuitry 504, Radio Frequency (RF) circuitry 506, front-end module (FEM) circuitry 508, one or more antennas 510, and power management circuitry (PMC) 512 coupled together at least as shown. The components of the illustrated device 500 may be included in a UE or a RAN node. In some embodiments, the device 500 may include fewer elements (e.g., a RAN node may not utilize application circuitry 502, and instead include a processor/controller to process IP data received from an EPC). In some embodiments, the device 500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 500. In some embodiments, processors of application circuitry 502 may process IP data packets received from an EPC.

The baseband circuitry 504 may include circuitry such as, but not limited to, one or more single-core or multi-core processors. The baseband circuitry 504 may include one or more baseband processors or control logic to process baseband signals received from a receive signal path of the RF circuitry 506 and to generate baseband signals for a transmit signal path of the RF circuitry 506. Baseband processing circuitry 504 may interface with the application circuitry 502 for generation and processing of the baseband signals and for controlling operations of the RF circuitry 506. For example, in some embodiments, the baseband circuitry 504 may include a third generation (3G) baseband processor 504A, a fourth generation (4G) baseband processor 504B, a fifth generation (5G) baseband processor 504C, or other baseband processor(s) 504B for other existing generations, generations in development or to be developed in the future (e.g., second generation (2G), sixth generation (6G), etc.). The baseband circuitry 504 (e.g., one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, or constellation mapping/demapping functionality. In some embodiments, encoding/decoding circuitry of the baseband circuitry 504 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EU- TRAN) or other wireless metropolitan area networks (WMAN), a wireless local area network (WLAN), a wireless personal area network (WPAN). Embodiments in which the baseband circuitry 504 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 504. RF circuitry 506 may also include a transmit signal path which may include circuitry to up-convert baseband signals provided by the baseband circuitry 504 and provide RF output signals to the FEM circuitry 508 for transmission.

In some embodiments, the receive signal path of the RF circuitry 506 may include mixer circuitry 506a, amplifier circuitry 506b and filter circuitry 506c. In some embodiments, the transmit signal path of the RF circuitry 506 may include filter circuitry 506c and mixer circuitry 506a. RF circuitry 506 may also include synthesizer circuitry 506d for synthesizing a frequency for use by the mixer circuitry 506a of the receive signal path and the transmit signal path. In some embodiments, the mixer circuitry 506a of the receive signal path may be configured to down-convert RF signals received from the FEM circuitry 508 based on the synthesized frequency provided by synthesizer circuitry 506d. The amplifier circuitry 506b may be configured to amplify the down-converted signals and the filter circuitry 506c may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, mixer circuitry 506a of the receive signal path may comprise passive mixers, although the scope of the embodiments is not limited in this respect.

In some embodiments, the mixer circuitry 506a of the transmit signal path may be configured to up-convert input baseband signals based on the synthesized frequency provided by the synthesizer circuitry 506d to generate RF output signals for the FEM circuitry 508. The baseband signals may be provided by the baseband circuitry 504 and may be filtered by filter circuitry 506c.

In some embodiments, the mixer circuitry 506a of the receive signal path and the mixer circuitry 506a of the transmit signal path may include two or more mixers and may be arranged for quadrature downconversion and upconversion, respectively. In some embodiments, the mixer circuitry 506a of the receive signal path and the mixer circuitry 506a of the transmit signal path may include two or more mixers and may be arranged for image rejection (e.g., Hartley image rejection). In some embodiments, the mixer circuitry 506a of the receive signal path and the mixer circuitry 506a of the transmit signal path may be arranged for direct downconversion and direct upconversion, respectively. In some embodiments, the mixer circuitry 506a of the receive signal path and the mixer circuitry 506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 504 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506d may be a fractional-N synthesizer or a fractional N/N+1 synthesizer, although the scope of the embodiments is not limited in this respect as other types of frequency synthesizers may be suitable. For example, synthesizer circuitry 506d may be a delta-sigma synthesizer, a frequency multiplier, or a synthesizer comprising a phase-locked loop with a frequency divider.

The synthesizer circuitry 506d may be configured to synthesize an output frequency for use by the mixer circuitry 506a of the RF circuitry 506 based on a frequency input and a divider control input. In some embodiments, the synthesizer circuitry 506d may be a fractional N/N+1 synthesizer.

In some embodiments, frequency input may be provided by a voltage controlled oscillator (VCO), although that is not a requirement. Divider control input may be provided by either the baseband circuitry 504 or the applications processor 502 depending on the desired output frequency. In some embodiments, a divider control input (e.g., N) may be determined from a look-up table based on a channel indicated by the applications processor 502.

Synthesizer circuitry 506d of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include, a receive signal path, which may include circuitry configured to operate on RF signals received from one or more antennas 510, amplify the received signals and provide the amplified versions of the received signals to the RF circuitry 506 for further processing. FEM circuitry 508 may also include a transmit signal path, which may include circuitry configured to amplify signals for transmission provided by the RF circuitry 506 for transmission by one or more of the one or more antennas 510. In various embodiments, the amplification through the transmit or receive signal paths may be done solely in the RF circuitry 506, solely in the FEM 508, or in both the RF circuitry 506 and the FEM 508.

In some embodiments, the FEM circuitry 508 may include a TX/RX switch to switch between transmit mode and receive mode operation. The FEM circuitry 508 may include a receive signal path and a transmit signal path. The receive signal path of the FEM circuitry 508 may include a low noise amplifier (LNA) to amplify received RF signals and provide the amplified received RF signals as an output (e.g., to the RF circuitry 506). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 510).

In some embodiments, the PMC 512 may manage power provided to the baseband circuitry 504. In particular, the PMC 512 may control power-source selection, voltage scaling, battery charging, or DC-to-DC conversion. The PMC 512 may often be included when the device 500 is capable of being powered by a battery, for example, when the device is included in a UE. The PMC 512 may increase the power conversion efficiency while providing desirable implementation size and heat dissipation characteristics.

FIG. 5 shows the PMC 512 coupled only with the baseband circuitry 504. However, in other embodiments, the PMC 512 may be additionally or alternatively coupled with, and perform similar power management operations for, other components such as, but not limited to, application circuitry 502, RF circuitry 506, or FEM 508.

In some embodiments, the PMC 512 may control, or otherwise be part of, various power saving mechanisms of the device 500. For example, if the device 500 is in an RRC_Connected state, where it is still connected to the RAN node as it expects to receive traffic shortly, then it may enter a state known as Discontinuous Reception Mode (DRX) after a period of inactivity. During this state, the device 500 may power down for brief intervals of time and thus save power.

If there is no data traffic activity for an extended period of time, then the device 500 may transition off to an RRC_Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 502 and processors of the baseband circuitry 504 may be used to execute elements of one or more instances of a protocol stack. For example, processors of the baseband circuitry 504, alone or in combination, may be used to execute Layer 3, Layer 2, or Layer 1 functionality, while processors of the application circuitry 502 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
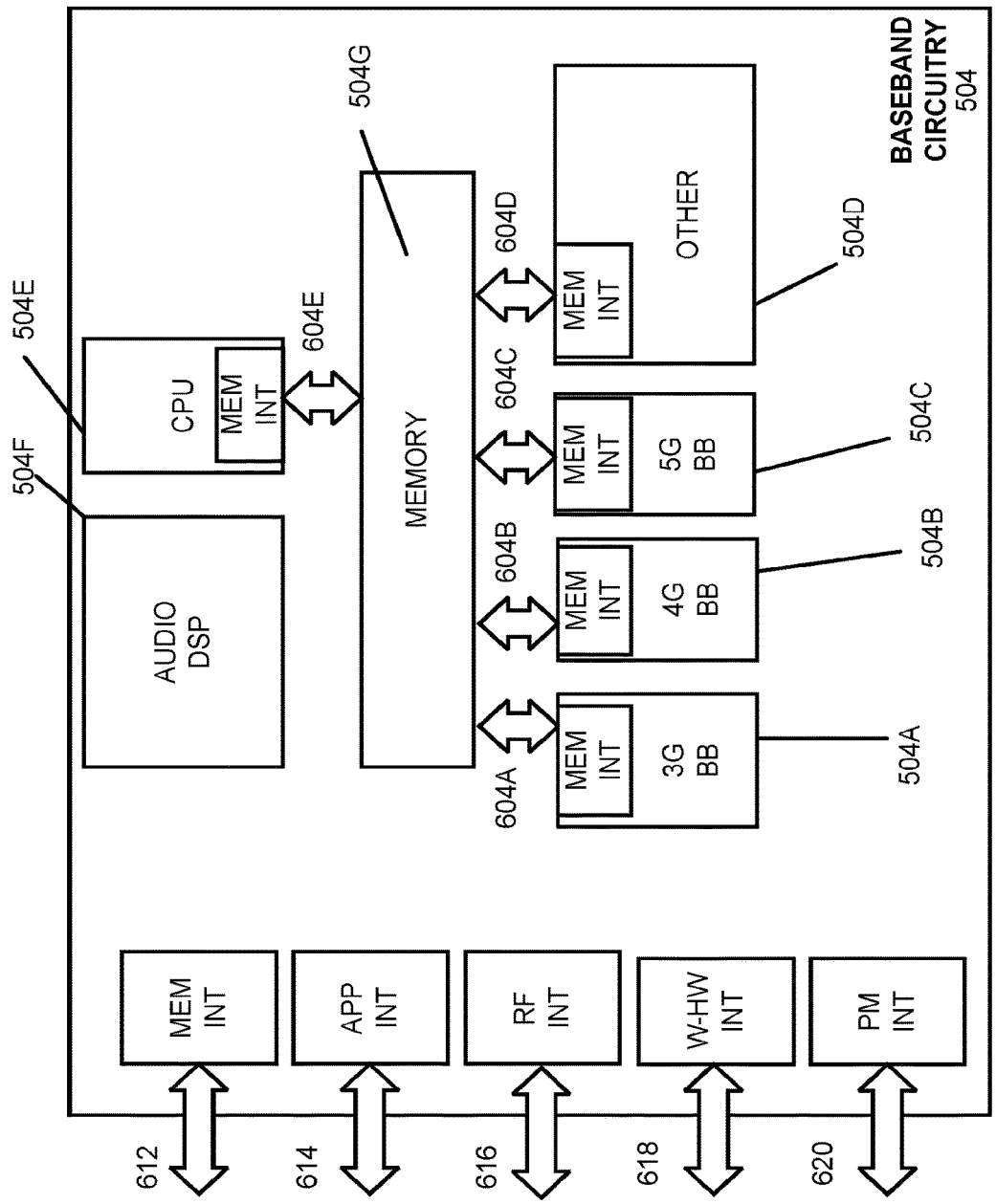
FIG. 6 depicts an example of interfaces of baseband circuitry in accordance with some embodiments.

FIG. 6 illustrates example interfaces of baseband circuitry in accordance with some embodiments. As discussed above, the baseband circuitry 504 of FIG. 5 may comprise processors 504A-504E and a memory 504G utilized by said processors. Each of the processors 504A-504E may include a memory interface, 604A-604E, respectively, to send/receive data to/from the memory 504G.

The baseband circuitry 504 may further include one or more interfaces to communicatively couple to other circuitries/devices, such as a memory interface 612 (e.g., an interface to send/receive data to/from memory external to the baseband circuitry 504), an application circuitry interface 614 (e.g., an interface to send/receive data to/from the application circuitry 502 of FIG. 5), an RF circuitry interface 616 (e.g., an interface to send/receive data to/from RF circuitry 506 of FIG. 5), a wireless hardware connectivity interface 618 (e.g., an interface to send/receive data to/from Near Field Communication (NFC) components, Bluetooth® components (e.g. Bluetooth® Low Energy), Wi-Fi® components, and other communication components), and a power management interface 620 (e.g., an interface to send/receive power or control signals to/from the PMC 512.

Figure 7:
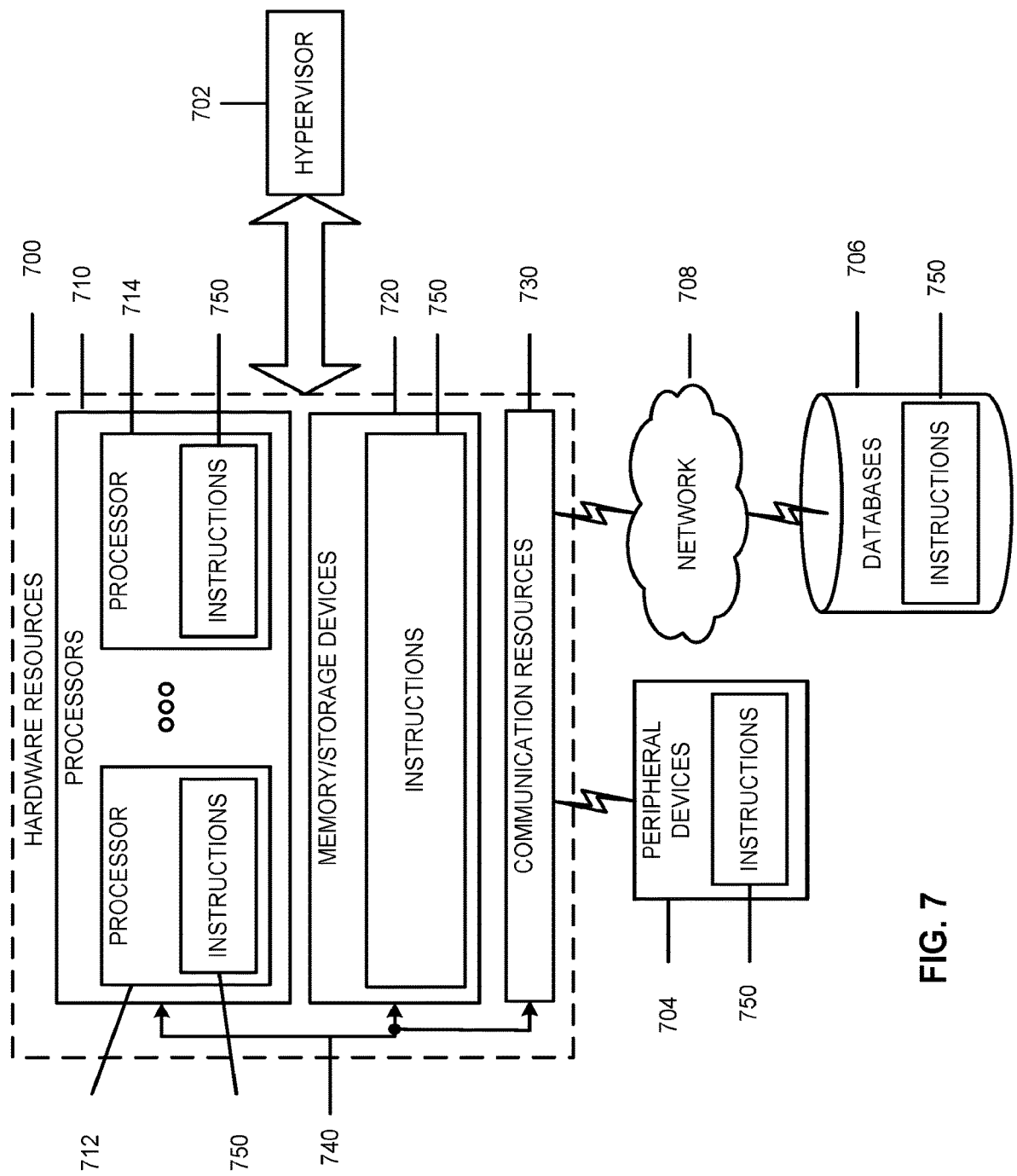
FIG. 7 depicts a block diagram illustrating components, according to some embodiments, able to read instructions from a machine-readable or computer-readable medium (e.g., a non-transitory machine-readable storage medium) and perform any one or more of the methodologies discussed herein.

FIG. 7 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (e.g., NFV) is utilized, a hypervisor 702 may be executed to provide an execution environment for one or more network slices/sub-slices to utilize the hardware resources 700.

The processors 710 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Figure 2:
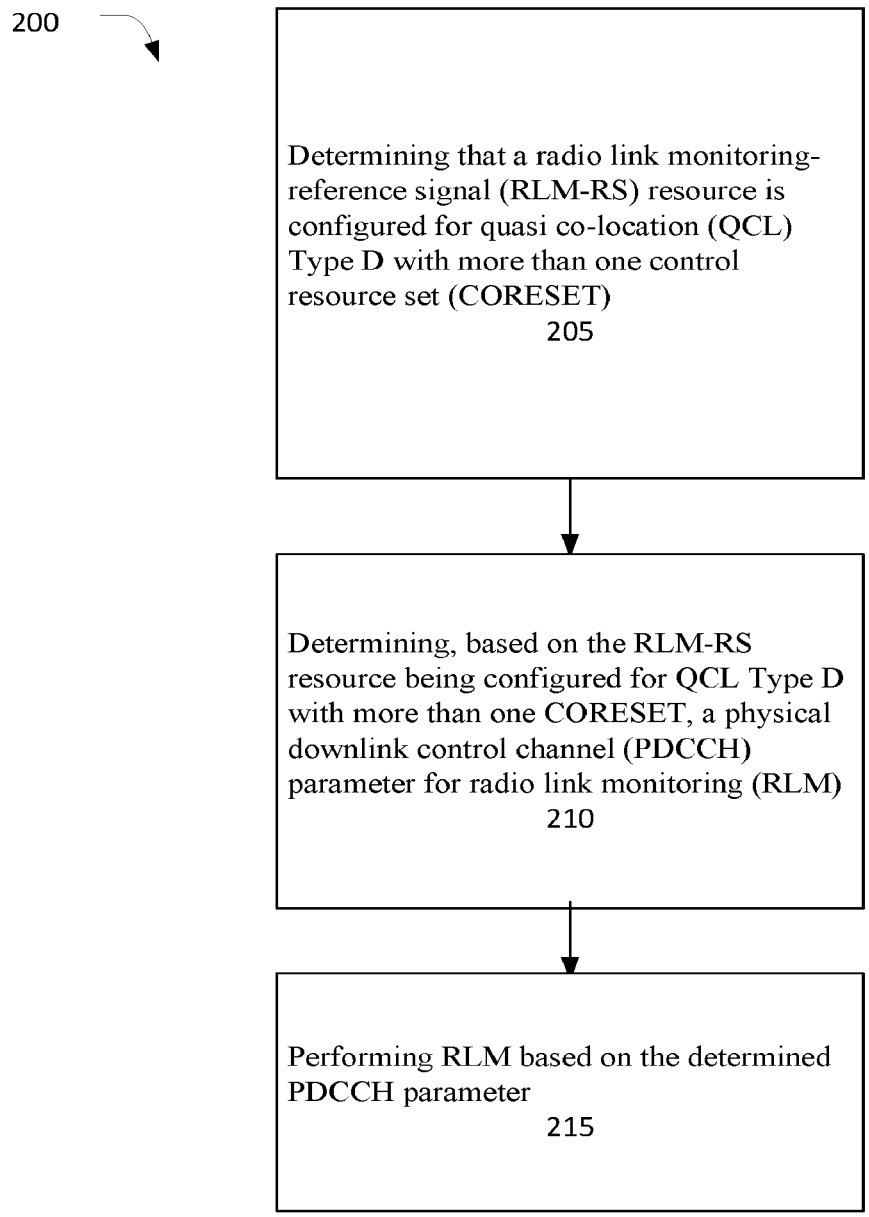

In various embodiments, the devices/components of FIGS. 4-7, and particularly the baseband circuitry of FIG. 6, may be used to practice, in whole or in part, any of the operation flow/algorithmic structures depicted in FIGS. 1-3.

[TO DO] One example of an operation flow/algorithmic structure is depicted in FIG. 1, which may be performed by a user equipment (UE) in accordance with some embodiments. In this example, operation flow/algorithmic structure 100 may include, at 105, retrieving, from memory, configuration information for a radio link monitoring-reference signal (RLM-RS) resource. Operation flow/algorithmic structure 100 may further include, at 110, determining, based on the configuration information, that the RLM-RS resource is configured for quasi co-location (QCL) Type D with more than one control resource set (CORESET). Operation flow/algorithmic structure 100 may further include, at 115, determining, based on the RLM-RS resource being configured for QCL Type D with more than one CORESET, a physical downlink control channel (PDCCH) parameter for radio link monitoring (RLM).

Another example of an operation flow/algorithmic structure is depicted in FIG. 2, which may be performed by a UE in accordance with some embodiments. In this example, operation flow/algorithmic structure 200 may include, at 205, determining that a radio link monitoring-reference signal (RLM-RS) resource is configured for quasi co-location (QCL) Type D with more than one control resource set (CORESET). Operation flow/algorithmic structure 200 may further include, at 210, determining, based on the RLM-RS resource being configured for QCL Type D with more than one CORESET, a physical downlink control channel (PDCCH) parameter for radio link monitoring (RLM). Operation flow/algorithmic structure 200 may further include, at 215, performing RLM based on the determined PDCCH parameter.

Another example of an operation flow/algorithmic structure is depicted in FIG. 3, which may be performed by a UE in accordance with some embodiments. In this example, operation flow/algorithmic structure 300 may include, at 305, determining, based on information associated with a RLM-RS resource, that the RLM-RS resource is configured for quasi co-location (QCL) Type D with more than one control resource set (CORESET). Operation flow/algorithmic structure 300 may further include, at 310, determining, based on the RLM-RS resource being configured for QCL Type D with more than one CORESET, a physical downlink control channel (PDCCH) parameter for radio link monitoring (RLM).

EXAMPLES

Some non-limiting examples are provided below.

Example 1 includes an apparatus comprising: memory to store configuration information for a radio link monitoring-reference signal (RLM-RS) resource: and processing circuitry, coupled with the memory, to: retrieve the configuration information from memory; determine, based on the configuration information, that the RLM-RS resource is configured for quasi co-location (QCL) Type D with more than one control resource set (CORESET); and determine, based on the RLM-RS resource being configured for QCL Type D with more than one CORESET, a physical downlink control channel (PDCCH) parameter for radio link monitoring (RLM).

Example 2 includes the apparatus of example 1 or some other example herein, wherein the PDCCH parameter is determined based on a single CORESET, and wherein the single CORESET is the only CORESET used by the apparatus for PDCCH monitoring.

Example 3 includes the apparatus of example 1 or some other example herein, wherein the PDCCH parameter is determined based on a CORSET having a lowest index among a plurality of CORESETs used by the apparatus for PDCCH monitoring.

Example 4 includes the apparatus of example 1 or some other example herein, wherein the PDCCH parameter is determined based on a CORSET having a highest index among a plurality of CORESETs used by the apparatus for PDCCH monitoring.

Example 5 includes the apparatus of example 1 or some other example herein, wherein the PDDCH parameter is determined based on a CORESET having a minimum hypothetical PDCCH block error rate (BLER) among a plurality of CORSETs used by the apparatus for PDCCH monitoring.

Example 6 includes the apparatus of example 1 or some other example herein, wherein the PDDCH parameter is determined based on a CORESET having a maximum hypothetical PDCCH block error rate (BLER) among a plurality of CORSETs used by the apparatus for PDCCH monitoring.

Example 7 includes the apparatus of any one of examples 1-6 or some other example herein, wherein the processing circuitry is further to perform RLM based on the determined PDCCH parameter.

Example 8 includes the apparatus of any one of examples 1-6 or some other example herein, wherein the apparatus is a user equipment (UE) or a portion thereof.

Example 9 includes one or more computer-readable media storing instructions that, when executed by one or more processors, cause a user equipment (UE) to: determine that a radio link monitoring-reference signal (RLM-RS) resource is configured for quasi co-location (QCL) Type D with more than one control resource set (CORESET); determine, based on the RLM-RS resource being configured for QCL Type D with more than one CORESET, a physical downlink control channel (PDCCH) parameter for radio link monitoring (RLM); and perform RLM based on the determined PDCCH parameter.

Example 10 includes the one or more computer-readable media of example 8 or some other example herein, wherein the PDCCH parameter is determined based on a single CORESET, and wherein the single CORESET is the only CORESET used by the apparatus for PDCCH monitoring.

Example 11 includes the one or more computer-readable media of example 8 or some other example herein, wherein the PDCCH parameter is determined based on a CORSET having a lowest index among a plurality of CORESETs used by the apparatus for PDCCH monitoring.

Example 12 includes the one or more computer-readable media of example 8 or some other example herein, wherein the PDCCH parameter is determined based on a CORSET having a highest index among a plurality of CORESETs used by the apparatus for PDCCH monitoring.

Example 13 includes the one or more computer-readable media of example 8 or some other example herein, wherein the PDDCH parameter is determined based on a CORESET having a minimum hypothetical PDCCH block error rate (BLER) among a plurality of CORSETs used by the apparatus for PDCCH monitoring.

Example 14 includes the one or more computer-readable media of example 8 or some other example herein, wherein the PDDCH parameter is determined based on a CORESET having a maximum hypothetical PDCCH block error rate (BLER) among a plurality of CORSETs used by the apparatus for PDCCH monitoring.

Example 15 includes an apparatus of a user equipment (UE) comprising: memory to store: information associated with a radio link monitoring-reference signal (RLM-RS) resource; and processing circuitry, coupled with the memory, to: determine, based on the information associated with the RLM-RS resource, that the RLM-RS resource is configured for quasi co-location (QCL) Type D with more than one control resource set (CORESET); and determine, based on the RLM-RS resource being configured for QCL Type D with more than one CORESET, a physical downlink control channel (PDCCH) parameter for radio link monitoring (RLM).

Example 16 includes the apparatus of example 15 or some other example herein, wherein the PDCCH parameter is determined based on a single CORESET, and wherein the single CORESET is the only CORESET used by the apparatus for PDCCH monitoring.

Example 17 includes the apparatus of example 15 or some other example herein, wherein the PDCCH parameter is determined based on a CORSET having a lowest index among a plurality of CORESETs used by the apparatus for PDCCH monitoring.

Example 18 includes the apparatus of example 15 or some other example herein, wherein the PDCCH parameter is determined based on a CORSET having a highest index among a plurality of CORESETs used by the apparatus for PDCCH monitoring.

Example 19 includes the apparatus of example 15 or some other example herein, wherein the PDDCH parameter is determined based on a CORESET having a minimum hypothetical PDCCH block error rate (BLER) among a plurality of CORSETs used by the apparatus for PDCCH monitoring.

Example 20 includes the apparatus of example 15 or some other example herein, wherein the PDDCH parameter is determined based on a CORESET having a maximum hypothetical PDCCH block error rate (BLER) among a plurality of CORSETs used by the apparatus for PDCCH monitoring.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, and/or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a method of communicating in a wireless network as shown and described herein.

Example 27 may include a system for providing wireless communication as shown and described herein.

Example 28 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:

1. A user equipment (UE), comprising:
memory to store configuration information for a radio link monitoring-reference signal (RLM-RS) resource; and
processing circuitry, coupled with the memory, to:
retrieve the configuration information from the memory;
determine, based on the configuration information, that the RLM-RS resource is configured with more than one control resource sets (CORESETs); and
determine, based on the RLM-RS resource being configured with more than one CORESETs, a physical downlink control channel (PDCCH) parameter for radio link monitoring (RLM).

2. The UE of claim 1, wherein the RLM-RS resource is configured for quasi co-location (QCL) with the more than one CORESETs.

3. The UE of claim 1, wherein the PDCCH parameter is determined based on a CORESET of the more than one CORESETs configured as a PDCCH common search space.

4. The UE of claim 1, wherein the PDCCH parameter is determined based on a CORSET of the more than one CORESETs having a lowest index among a plurality of CORESETs used by the UE for PDCCH radio link monitoring.

5. The UE of claim 1, wherein the PDCCH parameter is determined based on a CORSET of the more than one CORESETs having a highest index among a plurality of CORESETs used by the UE for PDCCH radio link monitoring.

6. The UE of claim 1, wherein the PDDCH parameter is determined based on a CORESET of the more than one CORESETs having a minimum hypothetical PDCCH block error rate (BLER) among a plurality of CORSETs used by the UE for PDCCH radio link monitoring.

7. The UE of claim 1, wherein the PDDCH parameter is determined based on a CORESET of the more than one CORESETs having a maximum hypothetical PDCCH block error rate (BLER) among a plurality of CORSETs used by the UE for PDCCH radio link monitoring.

8. The UE of claim 1, wherein the processing circuitry is further to perform RLM based on the determined PDCCH parameter.

9. One or more non-transitory computer-readable media storing instructions that, when executed by one or more processors, cause a user equipment (UE) to:
 determine that a radio link monitoring-reference signal (RLM-RS) resource is configured with more than one control resource sets (CORESETs);
 determine, based on the RLM-RS resource being configured with more than one CORESETs, a physical downlink control channel (PDCCH) parameter for radio link monitoring (RLM); and
 perform RLM based on the determined PDCCH parameter.

10. The one or more non-transitory computer-readable media of claim 9, wherein the RLM-RS resource is configured for quasi co-location (QCL) with the more than one CORESETs.

11. The one or more non-transitory computer-readable media of claim 9, wherein the PDCCH parameter is determined based on a single CORESET, and wherein the single CORESET is the only CORESET used by the UE for PDCCH radio link monitoring.

12. The one or more non-transitory computer-readable media of claim 9, wherein the PDCCH parameter is determined based on a CORSET of the more than one CORESETs having a lowest index among a plurality of CORESETs used by the UE for PDCCH radio link monitoring.

13. The one or more non-transitory computer-readable media of claim 9, wherein the PDCCH parameter is determined based on a CORSET of the more than one CORESETs having a highest index among a plurality of CORESETs used by the UE for PDCCH radio link monitoring.

14. The one or more non-transitory computer-readable media of claim 9, wherein the PDDCH parameter is determined based on a CORESET of the more than one CORESETs having a minimum hypothetical PDCCH block error rate (BLER) among a plurality of CORSETs used by the UE for PDCCH radio link monitoring.

15. A user equipment (UE) comprising:
 memory to store configuration information associated with a radio link monitoring-reference signal (RLM-RS) resource; and
 processing circuitry, coupled with the memory, to:
  determine, based on the configuration information associated with the RLM-RS resource, that the RLM-RS resource is configured with more than one control resource sets (CORESETs); and
  monitor downlink link quality for a downlink radio link based on reference signals in the configured RLM-RS resource.

16. The UE of claim 15, wherein to monitor downlink link quality, the processing circuitry is configured to estimate the downlink link quality on a reference signal in the configured RLM-RS resource, and further compare the estimated downlink link quality with one or more predetermined threshold values.

17. The UE of claim 16, wherein the one or more predetermined threshold values includes a threshold value $Q_{out}$ defined as a level at which the downlink radio link cannot be reliably received and related to an out-of-sync block error rate ($BLER_{out}$).

18. The UE of claim 16, wherein the one or more predetermined threshold values includes a threshold value $Q_{in}$ defined as a level at which the estimated downlink radio link quality is significantly more reliably received than at $Q_{out}$ and related to an in-sync block error rate ($BLER_{in}$).

19. The UE of claim 15, wherein the configured RLM-RS resource can include synchronization signal blocks (SSBs) or channel state information-reference signals (CSI-RSs).

20. The UE of claim 19, wherein the configured RLM-RS resource based on SSBs is configured for a Primary serving Cell (Pcell).

* * * * *

UNITED STATES PATENT AND TRADEMARK OFFICE
CERTIFICATE OF CORRECTION

PATENT NO. : 11,855,709 B2
APPLICATION NO. : 17/948583
DATED : December 26, 2023
INVENTOR(S) : Li et al.

It is certified that error appears in the above-identified patent and that said Letters Patent is hereby corrected as shown below:

In the Specification

In Column 3, Line 2, delete "($BLER_{in}$)," and insert -- ($BLER_{in}$). --, therefor.

In Column 6, Line 23, delete "Out-of-sync" and insert -- Out-of-sync --, therefor.

In Column 9, under "TABLE RLM.2-3", Line 1, delete "Evaluate_cut" and insert -- Evaluate_out --, therefor.

In Column 9, under "TABLE RLM.2-3", Line 4, delete "(200,cei" and insert -- (200,ceil --, therefor.

In Column 9, under "TABLE RLM.2-4", Line 1, delete "Evaluate_cut" and insert -- Evaluate_out --, therefor.

In Column 9, under "TABLE RLM.2-4", Line 4, delete "(200,cei" and insert -- (200,ceil --, therefor.

In Column 9, under "TABLE RLM.3-1", Line 7, delete "8]" and insert -- [8] --, therefor.

In Column 11, Line 51, delete "hut" and insert -- but --, therefor.

In Column 12, Line 31, delete "(TCSI-RS<$T_{SMTCperiod}$)" and insert -- ($T_{CSI-RS}$<$T_{SMTCperiod}$) --, therefor.

In Column 15, Line 57, delete "slot n" and insert -- slot $^{n}$ --, therefor.

In Column 15, Line 63, delete "slot n+4" and insert -- slot $^{n+4}$ --, therefor.

In Column 16, Line 43, delete "e.g," and insert -- e.g., --, therefor.

In Column 26, Line 33, delete "CORSET" and insert -- CORESET --, therefor.

Signed and Sealed this
Twelfth Day of November, 2024

Katherine Kelly Vidal
*Director of the United States Patent and Trademark Office*

In Column 26, Line 39, delete "CORSET" and insert -- CORESET --, therefor.

In Column 26, Line 46, delete "CORSETs" and insert -- CORESETs --, therefor.

In Column 26, Line 51, delete "CORSETs" and insert -- CORESETs --, therefor.

In Column 27, Line 11, delete "CORSET" and insert -- CORESET --, therefor.

In Column 27, Line 17, delete "CORSET" and insert -- CORESET --, therefor.

In Column 27, Line 24, delete "CORSETs" and insert -- CORESETs --, therefor.

In Column 27, Line 30, delete "CORSETs" and insert -- CORESETs --, therefor.

In Column 27, Line 52, delete "CORSET" and insert -- CORESET --, therefor.

In Column 27, Line 57, delete "CORSET" and insert -- CORESET --, therefor.

In Column 27, Line 64, delete "CORSETs" and insert -- CORESETs --, therefor.

In Column 28, Line 2, delete "CORSETs" and insert -- CORESETs --, therefor.

In the Claims

In Column 28, Claim 4, Line 64, delete "CORSET" and insert -- CORESET --, therefor.

In Column 29, Claim 5, Line 2, delete "CORSET" and insert -- CORESET --, therefor.

In Column 29, Claim 6, Line 9, delete "CORSETs" and insert -- CORESETs --, therefor.

In Column 29, Claim 7, Line 14, delete "CORSETs" and insert -- CORESETs --, therefor.

In Column 29, Claim 12, Line 42, delete "CORSET" and insert -- CORESET --, therefor.

In Column 30, Claim 13, Line 1, delete "CORSET" and insert -- CORESET --, therefor.

In Column 30, Claim 14, Line 8, delete "CORSETs" and insert -- CORESETs --, therefor.